Figure 1:
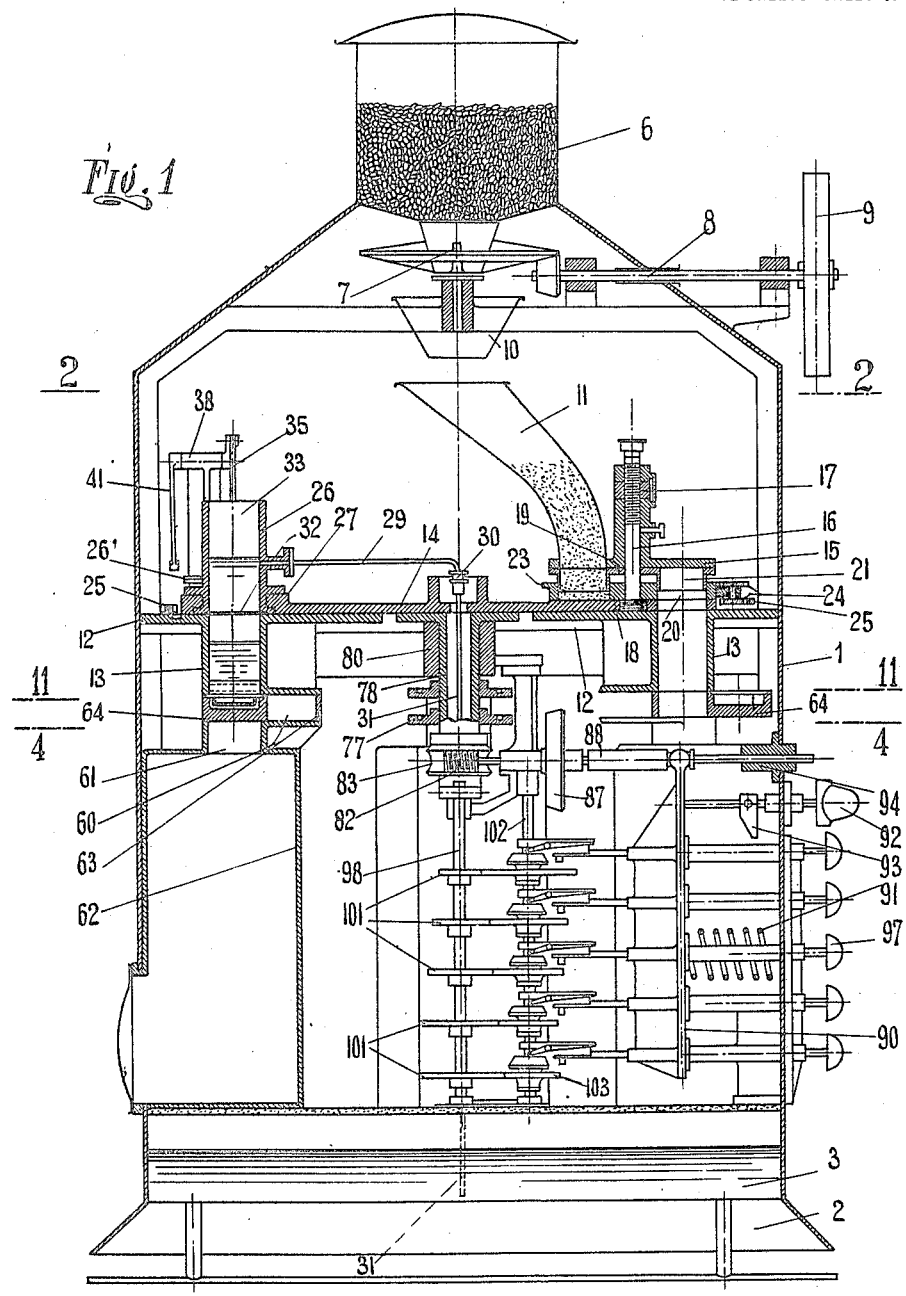

P. T. ARDUINO.
MACHINE FOR MAKING COFFEE AND LIKE INFUSIONS.
APPLICATION FILED FEB. 3, 1921.

1,390,008.

Patented Sept. 6, 1921.
12 SHEETS—SHEET 1.

Inventor:
Pier Tereszo Arduino
By [signature]
Attorney

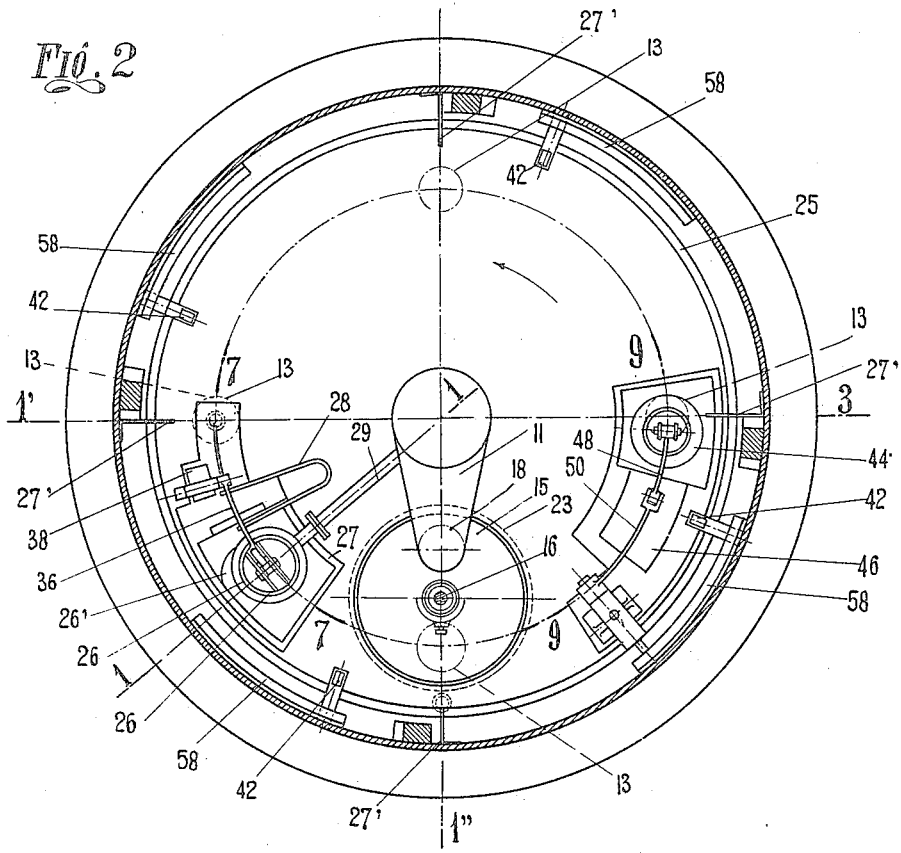
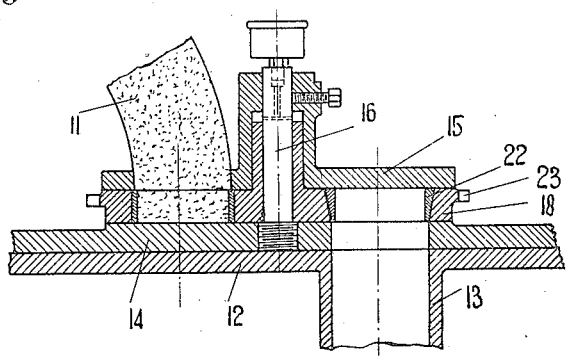

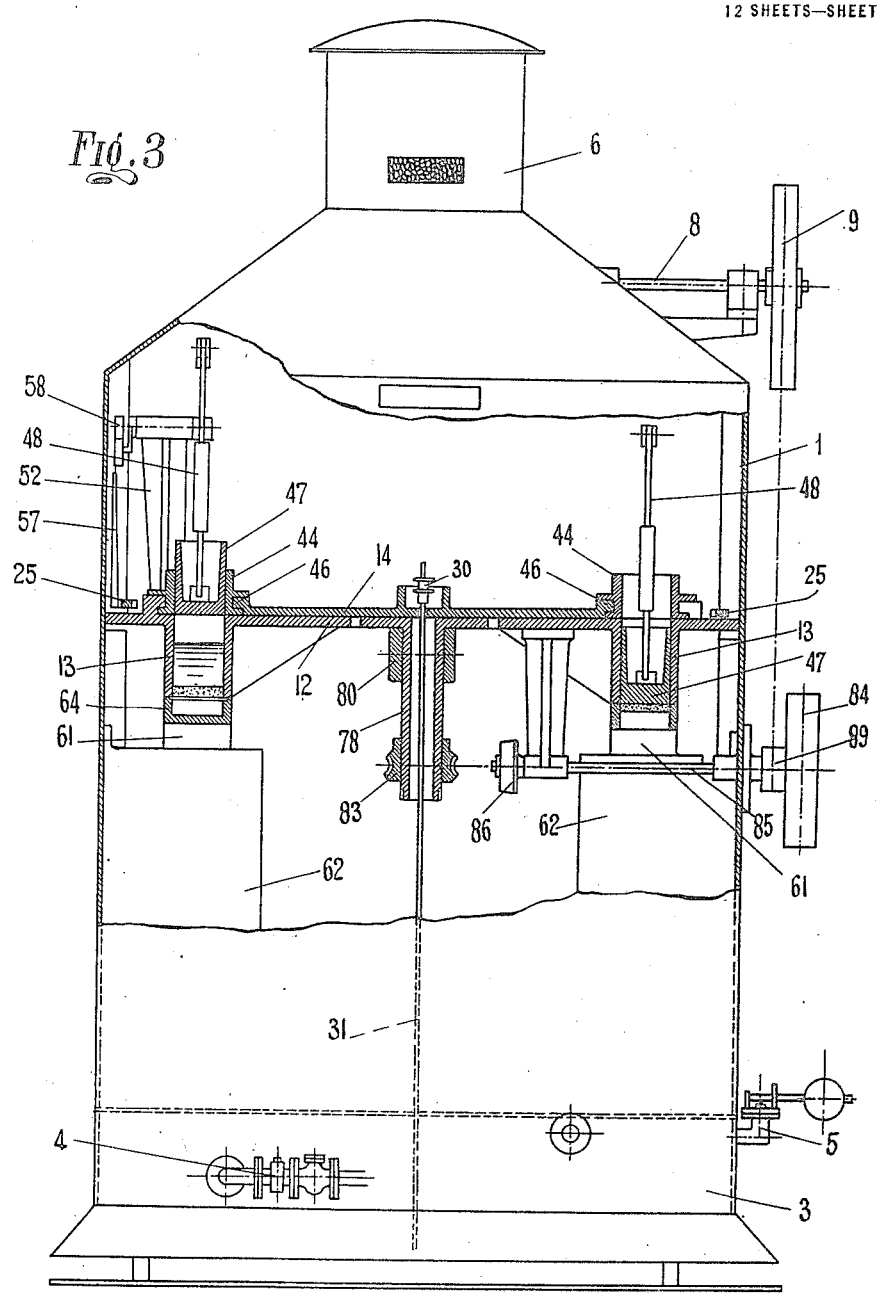

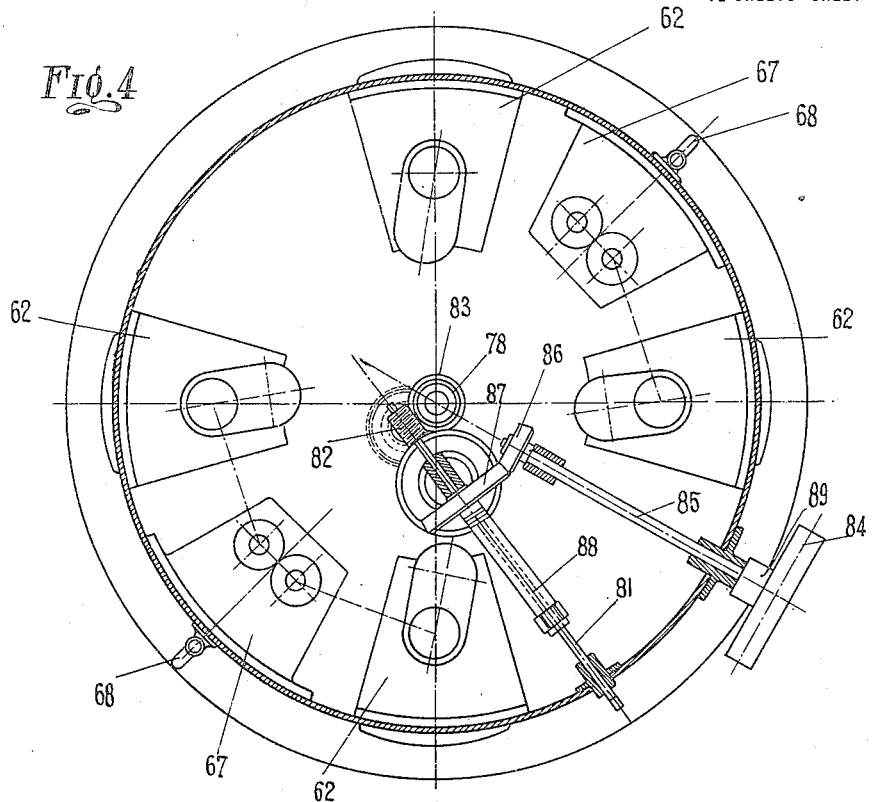
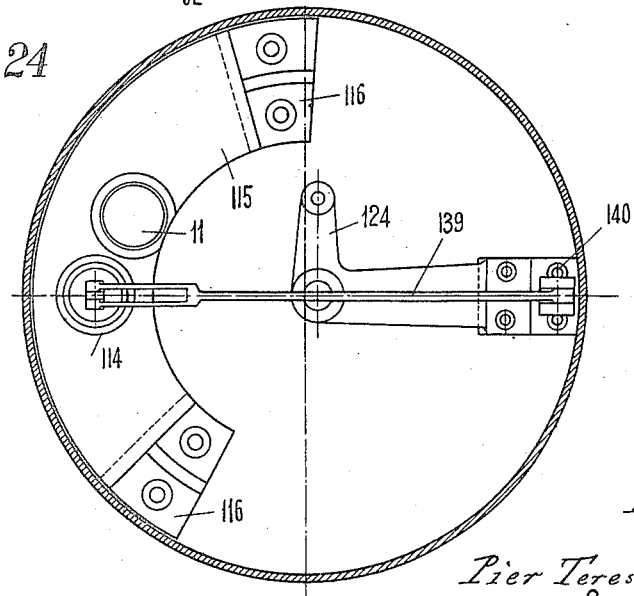

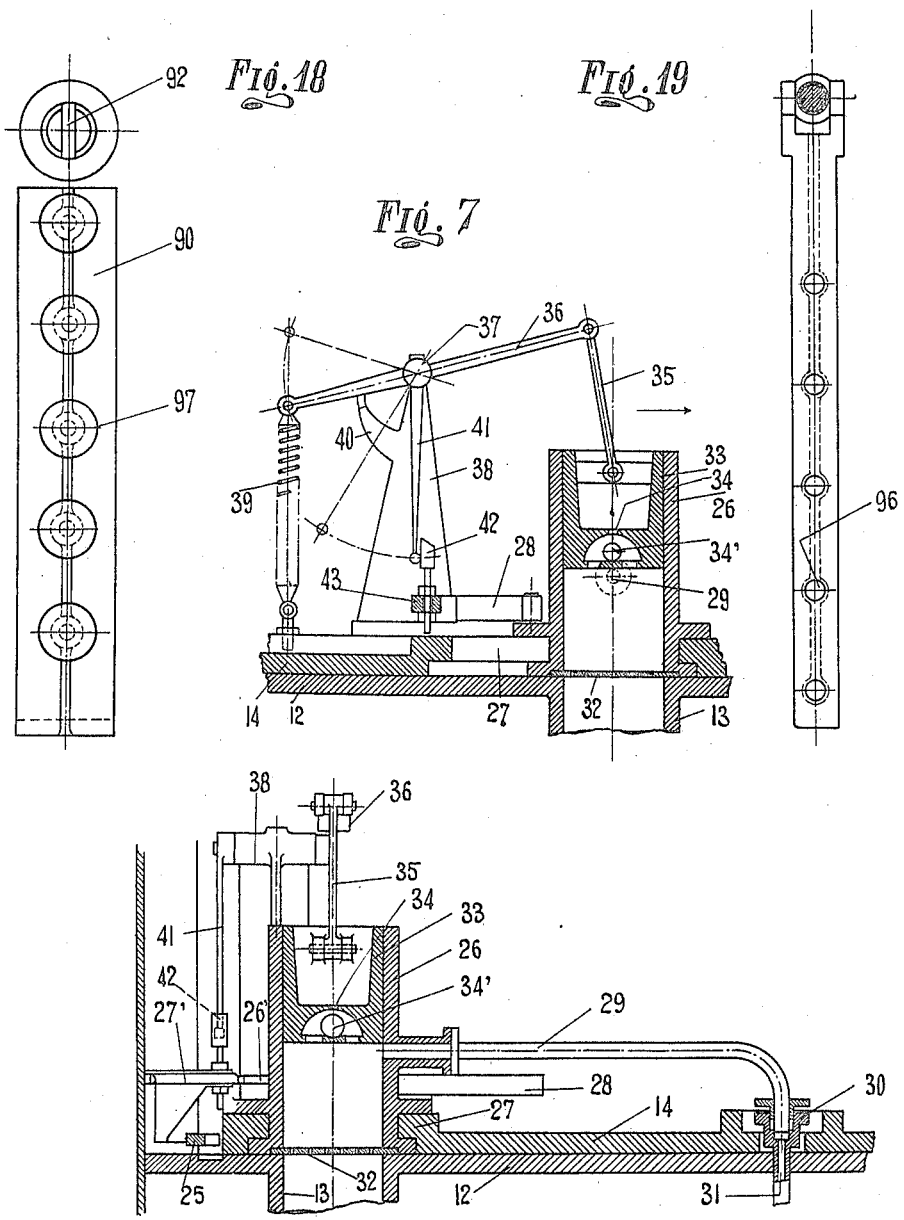

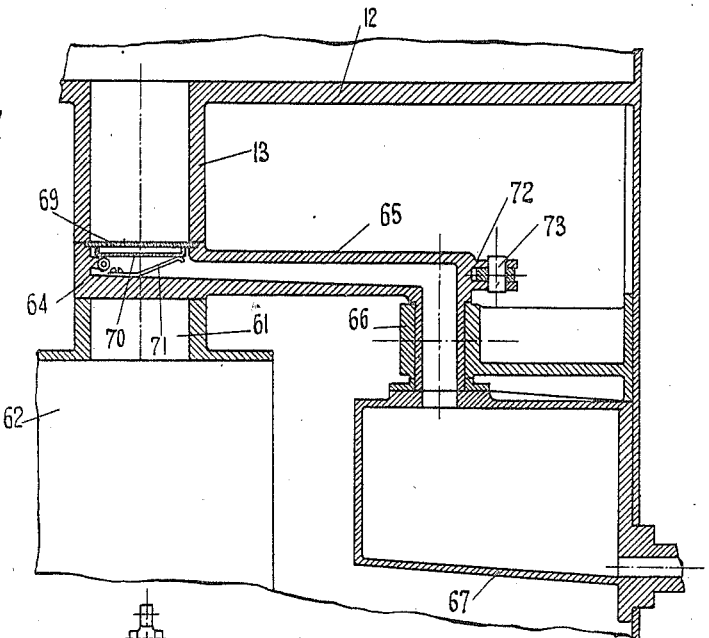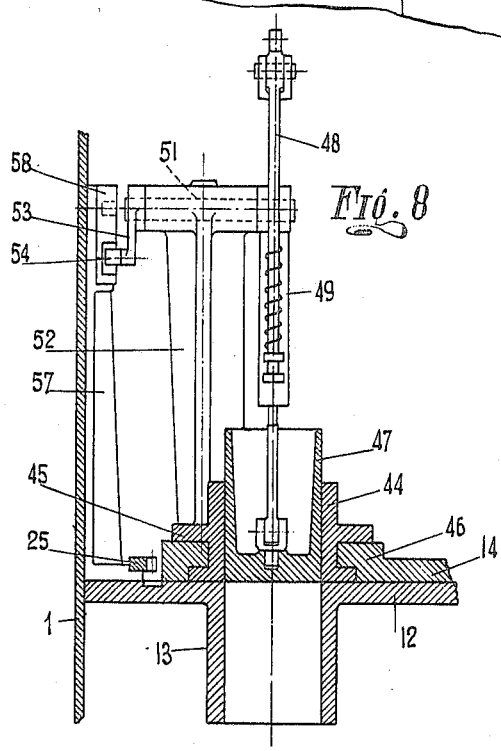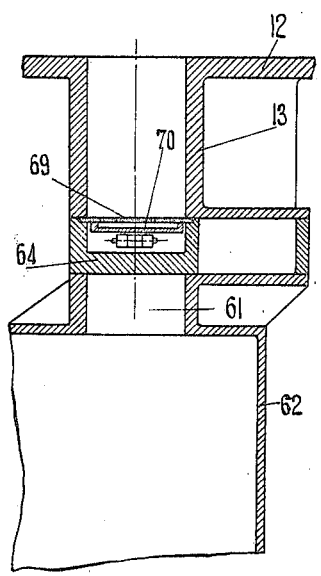

P. T. ARDUINO.
MACHINE FOR MAKING COFFEE AND LIKE INFUSIONS.
APPLICATION FILED FEB. 3, 1921.

1,390,008.

Patented Sept. 6, 1921.
12 SHEETS—SHEET 7.

Inventor:
Pier Teresio Arduino
By
Attorney.

P. T. ARDUINO.
MACHINE FOR MAKING COFFEE AND LIKE INFUSIONS.
APPLICATION FILED FEB. 3, 1921.
1,390,008.
Patented Sept. 6, 1921.
12 SHEETS—SHEET 8.
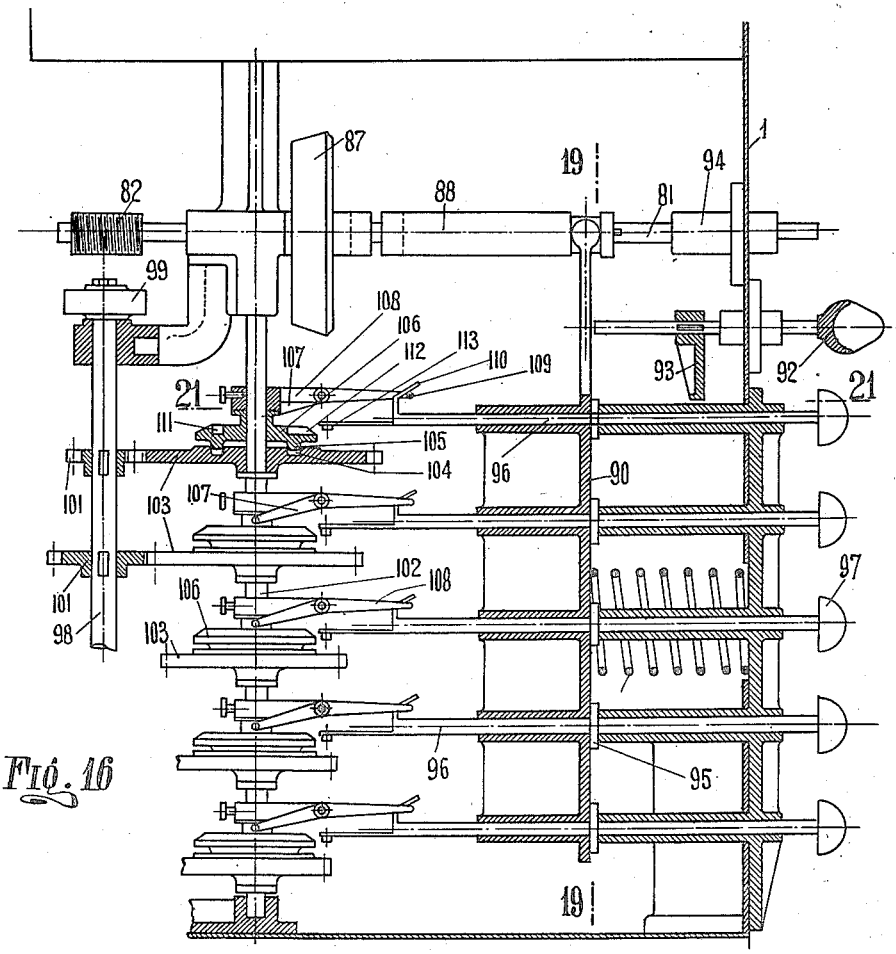
Fig. 16
Fig. 10
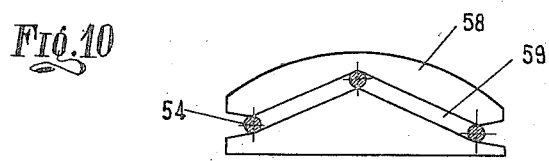
Inventor:
Pier Teresio Arduino
By Louis Poirier Le
Attorney P. T. ARDUINO.
MACHINE FOR MAKING COFFEE AND LIKE INFUSIONS.
APPLICATION FILED FEB. 3, 1921.
1,390,008.
Patented Sept. 6, 1921.
12 SHEETS—SHEET 9.
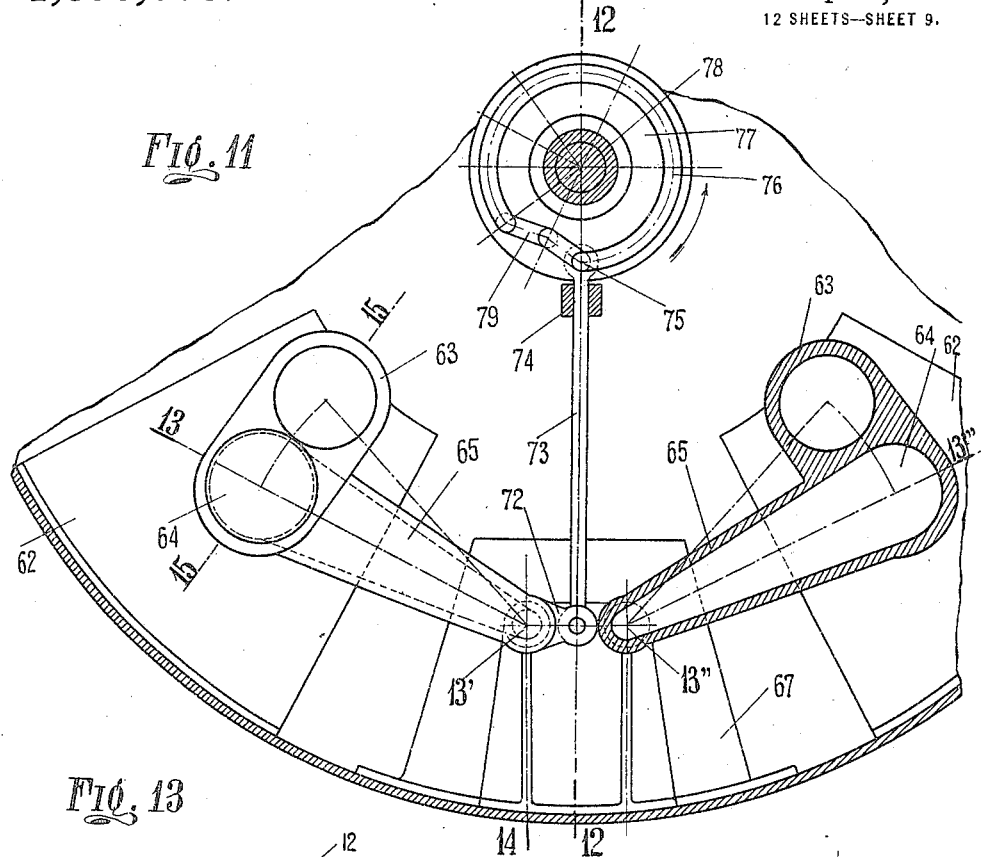
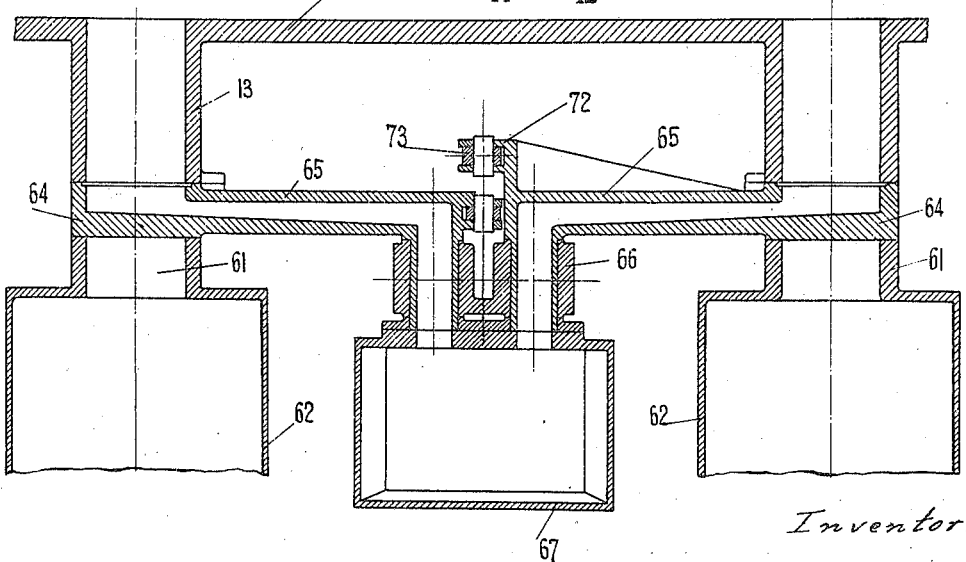
Inventor:
Pier Teresio Arduino
By [signature]
Attorney P. T. ARDUINO.
MACHINE FOR MAKING COFFEE AND LIKE INFUSIONS.
APPLICATION FILED FEB. 3, 1921.

1,390,008.

Patented Sept. 6, 1921.
12 SHEETS—SHEET 10.

Inventor:
Pier Teresio Arduino
By his Attorney

P. T. ARDUINO.
MACHINE FOR MAKING COFFEE AND LIKE INFUSIONS.
APPLICATION FILED FEB. 3, 1921.

1,390,008. Patented Sept. 6, 1921.
12 SHEETS—SHEET 11.

Inventor:
Pier Teresio Arduino
By Emile Bonnet Le
Attorney

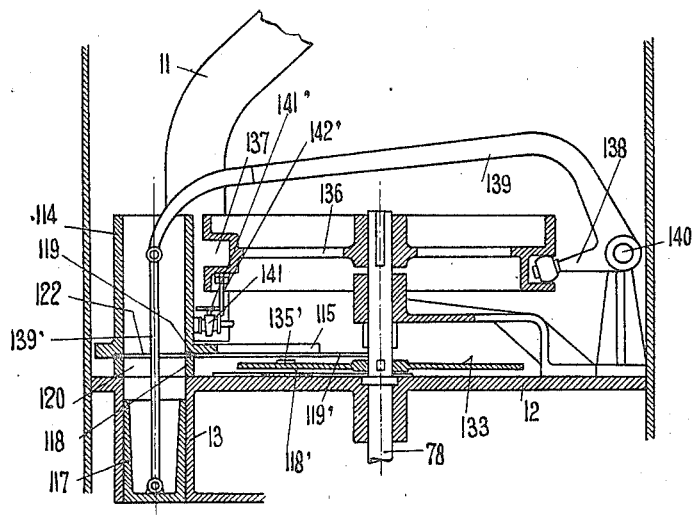
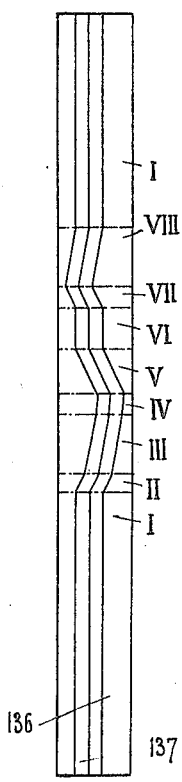
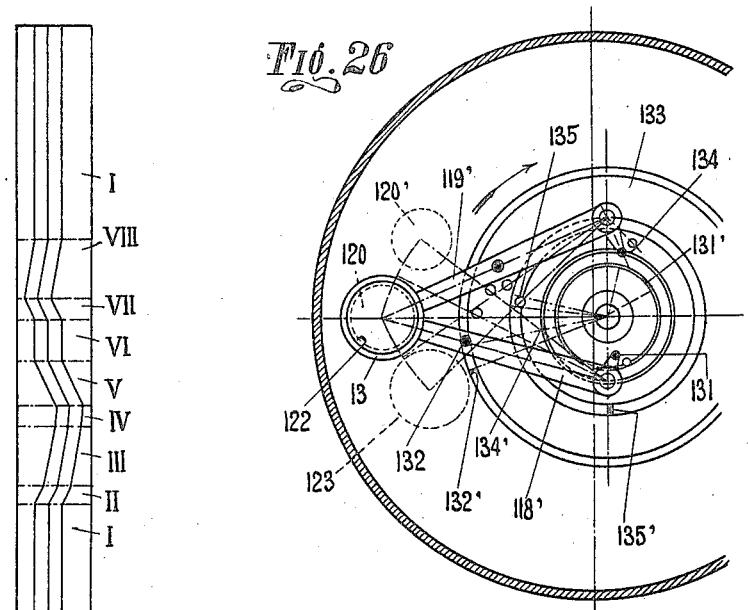

UNITED STATES PATENT OFFICE.

PIER TERESIO ARDUINO, OF TURIN, ITALY.

MACHINE FOR MAKING COFFEE AND LIKE INFUSIONS.

1,390,008. Specification of Letters Patent. Patented Sept. 6, 1921.

Application filed February 3, 1921. Serial No. 442,168.

*To all whom it may concern:*

Be it known that I, PIER TERESIO ARDUINO, a subject of the King of Italy, residing at Turin, Italy, have invented certain new and useful Improvements in Machines for Making Coffee and like Infusions, of which the following is a specification.

This invention relates to machines for preparing infusions of coffee or the like, in which the various necessary operations, that is to say the introduction of the desired quantity of ground coffee, the addition of hot water and the discharge of the infusion as well as of the exhaust coffee, are effected successively and automatically in one or more receptacles or vessels in which the measured quantities of ground coffee and of hot water are held together during the period of time required for the formation of the infusion.

According to this invention, the vessel or vessels in which the infusion is formed, are stationary and above them move, in such a manner as to arrive successively in register with said vessels, the parts for the introduction of the desired quantity of coffee and for the introduction of the necessary volume of hot water, while each vessel is closed at the bottom by parts which make it possible to discharge successively the infusion and the exhausted coffee or grounds.

The invention comprises mechanisms for operating the various movable parts as well as an automatic driving gear by means of which the machine can be kept working during a given period of time.

Finally, one of the constructions according to the invention makes it possible to collect in one or more reservoirs the infusion formed in the boiling vessels and to draw it from the said reservoirs instead of direct from the infusion vessels.

The accompanying drawings show, by way of example, two constructions of a machine according to this invention.

Figure 9:
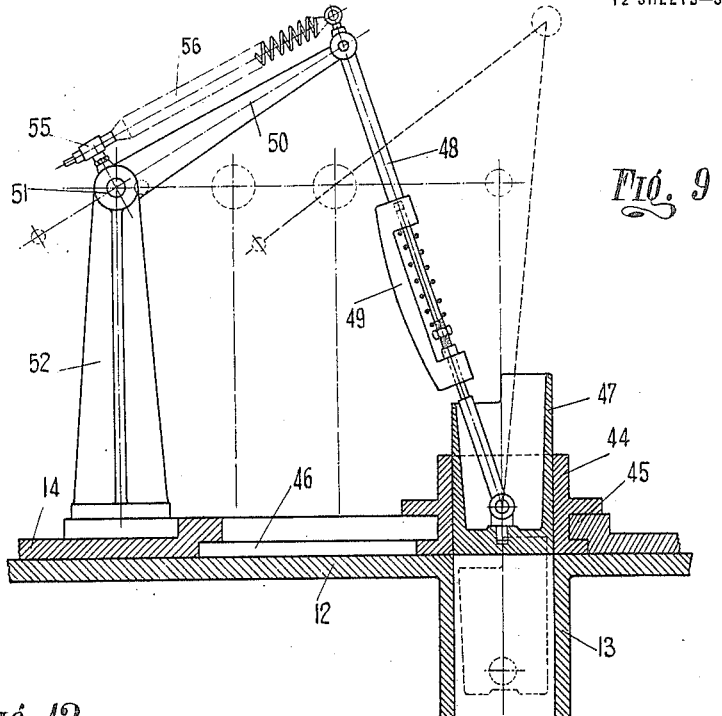
Figure 12:
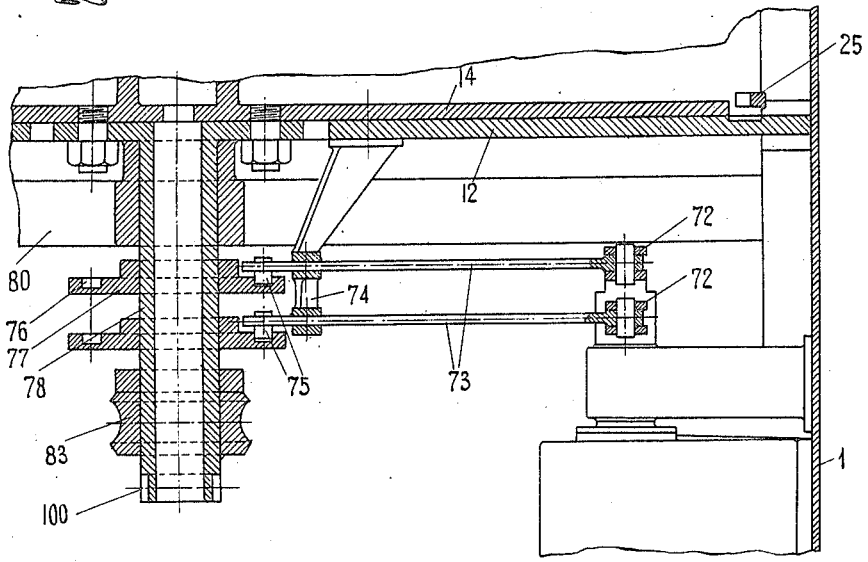
Figure 17:
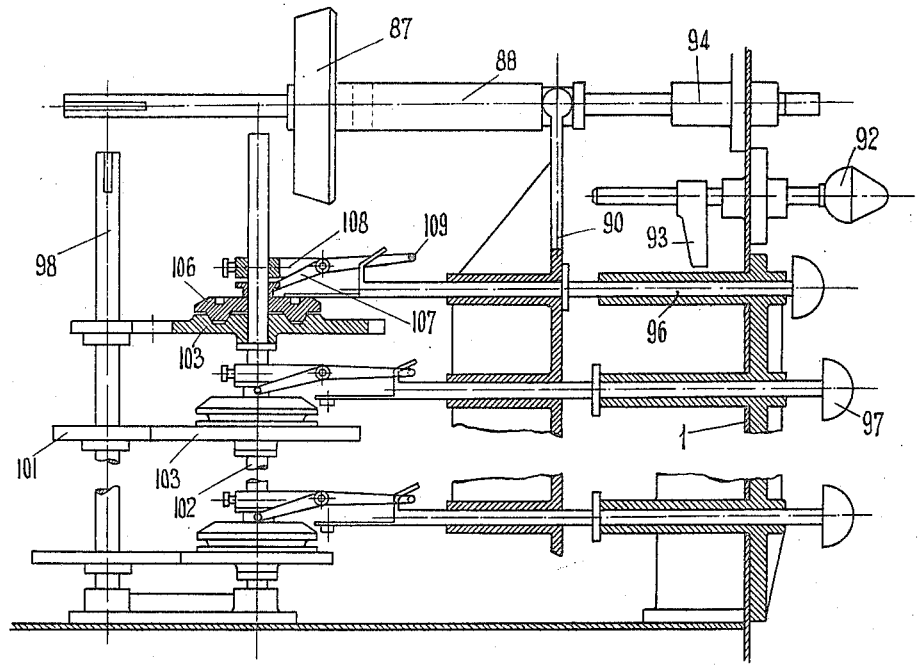
Figure 21:
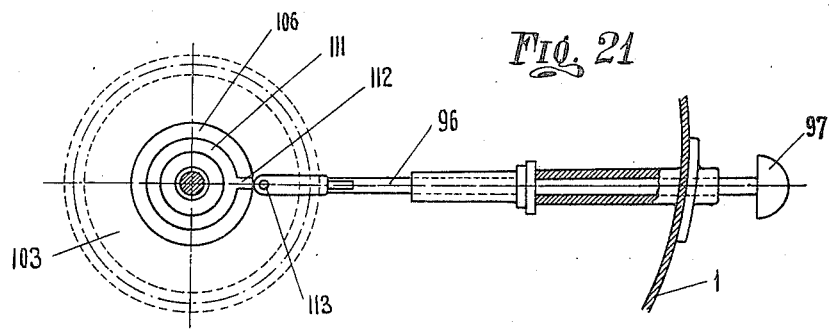
Figure 20:
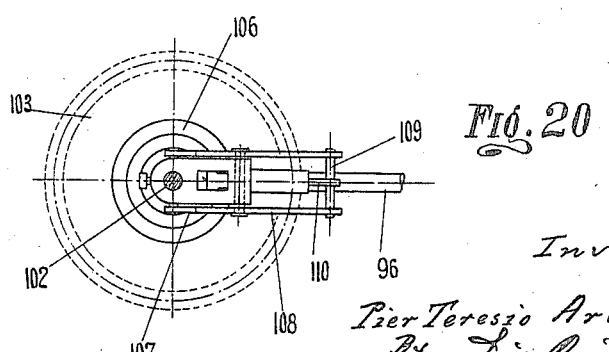
Figure 22:
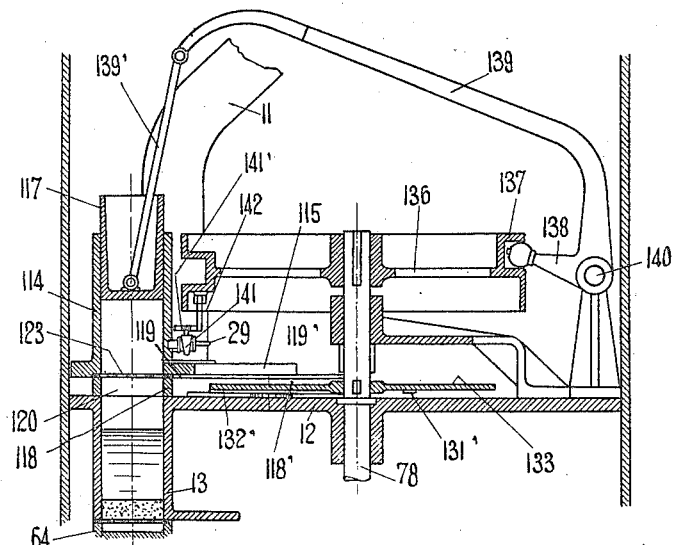
Figure 25:
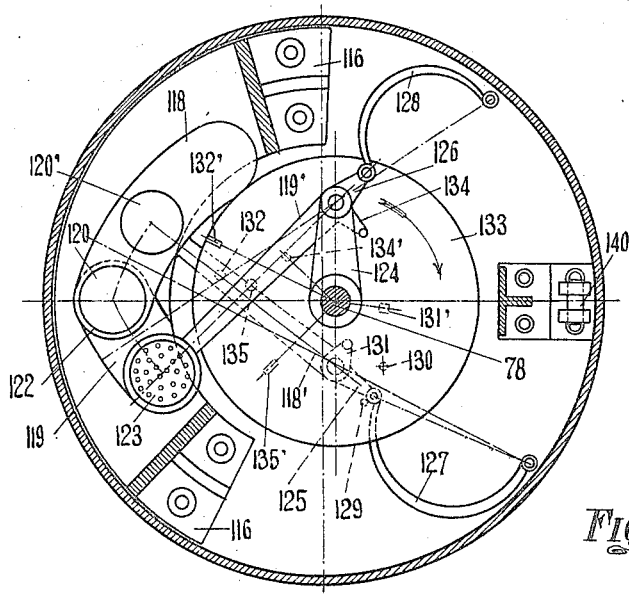

In said drawings, Figure 1 shows a first type, on the left hand side in vertical section on the line 1—1 of Fig. 2 above the plate 12, and on the line 1—1' below said plate, and on the right hand side, on the line 1—1'' of Fig. 2; Fig. 2 is a plan in section on the line 2—2 of Fig. 1; Fig. 3 is a vertical section on the line 1—3 of Fig. 2, with the parts in different positions in the two halves; Fig. 4 is a plan in section on the line 4—4 of Fig. 1; Fig. 5 shows, on an enlarged scale, a modified construction of a part of the machine shown in the right hand half of Fig. 1; Fig. 6 shows on an enlarged scale some of the parts shown on the left hand side of Fig. 1; Fig. 7 is a section on an enlarged scale on the arc 7—7 of Fig. 2; Fig. 8 is a partial section on an enlarged scale on the line 1—3 of Fig. 2; Fig. 9 is a section on the arc 9—9 of Fig. 2; Fig. 10 shows a detail in front elevation; Fig. 11 shows on an enlarged scale a part sectional plan on the line 11—11 of Fig. 1; Fig. 12 is a vertical section on the line 12—12 of Fig. 11; Fig. 13 is a vertical section on the line 13—13'—13''—13''' of Fig. 11; Fig. 14 is a vertical section on the line 13—13'—14 of Fig. 11; Fig. 15 is a section on the line 15—15 of Fig. 11; Fig. 16 shows in detail on an enlarged scale the driving gear parts shown in Fig. 1; Fig. 17 is a similar view with the parts in a different position; Fig. 18 is a front elevation of the plate carrying the operating buttons; Fig. 19 is a section on line 19—19 of Fig. 16; Fig. 20 shows in plan the central portion of Fig. 16; Fig. 21 is a plan in section on the line 21—21 of Fig. 16; Figs. 22 and 23 are two axial sections through the infusion vessel, with the parts in different positions, of another construction of the machine, comprising a single vessel or receptacle for the formation of coffee infusion; Fig. 24 is a corresponding plan, some of the parts being omitted; Fig. 25 is a plan in section, showing the movable parts; Fig. 26 is a diagram illustrating the working of the parts in question and Fig. 27 shows, developed in plan, the cam groove producing the movement of the piston.

As will be seen in Figs. 1–3, the machine is chiefly constituted by a casing 1 supported by a frame on which are mounted the chief parts. At the lower part is provided a space 2 for a stove, lamp or burner of any desired type, and the casing comprises a receptacle 3 intended to constitute the boiler and provided with the usual fittings such as feed connection 4, safety valve 5, and the like.

At the top of the casing 1 is mounted a receptacle 6, made of transparent material or provided with openings closed by transparent plates, intended to contain the coffee in grains. This receptacle is open at the bottom, and below the same is mounted a coffee mill 7 of any desired suitable type, operated by a gear 8 which receives its motion from a pulley 9.

The coffee mill 7 discharges into a hopper 10 opening above a chute 11 intended to supply the ground coffee to the measuring and distributing apparatus.

A horizontal plate or disk 12 secured to the frame and to the casing 1 supports the receptacles or vessels 13 in which the infusion is formed.

In the construction illustrated, there are four of such receptacles, but their number could be larger or smaller according to the capacity which the machine is to have. Above the said plate 12 is mounted, so as to rotate about the vertical axis of the machine, a plate or disk 14 which carries the various parts for the measuring of the ground coffee, for the supply of hot water and the discharge of the infusion and of the coffee grounds.

The part for measuring the ground coffee, comprises a disk 15 mounted on a vertical pivot pin 16 carried by the plate 14; the distance of the disk 15 from the said plate can be adjusted if desired by means of a screw and nut 17 (Fig. 1). The disk 15 has a circular opening with which engages the lower end of the chute 11, and below the disk 15, two other disks 18 and 19 are mounted loose on the pivot pin 16 and held apart by a spring (not shown).

The disk 18 which is in contact with the plate 14, comprises circular openings 20 in such a position that, on the disk being rotated about the pivot pin 16, they are carried into positions to coincide with the openings of the receptacles 13, and the disk 19 has an equal number of sockets 21 engaging with the openings 20 of the disk 18. In that way, by modifying the position of the disk 15 on the pivot 16, for instance by operating the nut 17, it is possible to modify the capacity of the small chambers constituted by the openings 20 of the disk 18 and by the sockets or sleeves 21 of the disks 19.

Such a regulation could also be effected in other ways, for instance by fitting sleeves 22 of different thickness into the openings 20 of the disk 18 (Fig. 5), in which case the disk 19 is dispensed with, and the disk 15 need not be vertically adjustable on the pivot pin 16.

In any case, the disk 18 is mounted so as to rotate about the pivot pin 16 when the plate 14 rotates about the central axis of the machine, the ratio of the two movements being calculated so as to bring one of the openings 20 opposite each of the receptacles 13, that is to say the ratio will be 2:1 in the construction illustrated in which the disk 18 has two openings. To that end the disk 18 is provided on its circumference with a set of teeth 23 engaging, by means of concentric pinions 24, with a toothed rim 25 secured to the frame of the machine.

Thus, when the plate 14 is rotated, the disk 18 will turn about the pivot pin 16, and its openings 20 in passing successively under the opening of the chute 11 and above the openings of the receptacles 13, will discharge into the latter the quantities of ground coffee which they received from the chute 11 and carried, during the rotation, inclosed between the bottom plate 14 and the upper disk 15.

The part for introducing hot water comprises a cylinder 26 (Figs. 1, 2, 6, and 7) mounted adjustably by means of lateral ribs in a guide 27 which occupies a small sector of the rotating plate 14. The cylinder 26 is forced by a spring 28 toward the front end of the guide 27 and comprises a tooth 26' intended to strike against a spring controlled stop 27' secured to the casing of the machine in register with each receptacle 13. To the cylinder 26 leads a pipe 29 connected through a stuffing box 30 to the fixed central tube 31 coming from the bottom of the boiler 3.

At the bottom of the cylinder 26 is mounted a perforated partition 32, and in the interior of the cylinder is mounted a piston or plunger 33 having at its bottom an opening 34 controlled by an automatic valve 34' (Figs. 6 and 7). The piston 33 is connected by means of a rod 35 to the end of a lever 36 pivoted at 37 to a bracket 38 secured to the plate 14. This lever is controlled by a spring 39 acting on its end opposite to the rod 35 so as to maintain the piston 33 in the highest position shown in Figs. 6 and 7. The lever 36 is stopped in that position by an arm 40 on the bracket 38, and the lever 36 has another arm 41 the end of which can strike the stops 42 mounted on the stationary part of the machine at such points that the movement of the arm 41, to which corresponds the downstroke of the piston 33, takes place when the cylinder 26 is above one of the receptacles 13 (see Figs. 1-2). Each stop 42 is vertically adjustable by means of a screw 43 for the purpose of regulating the amplitude of oscillation which the arm 41 makes on meeting the stop, and consequently of modifying the stroke of the piston 33.

The pipe 29 for the admission of hot water opens into the cylinder 26 in such a position that the communication is open when the piston 33 is at the upper end of the stroke, so that the useful stroke of the piston begins when the latter has closed communication between the cylinder and the boiler. The length of the said stroke can be regulated by modifying the height of the stop 42 which corresponds to a regulation of the volume of water which the piston injects into the receptacle 13 through the partition 32 by which the water is distributed over the whole of the cross-section of the receptacle itself.

The part intended to discharge the infusion and the exhausted coffee grounds from the receptacles 13 is similar to that which has been just described, and comprises (Figs. 2—3—8—9—and 10) a cylinder 44 of a diameter exactly equal to that of the receptacle 13 and mounted adjustably, by means of lateral ribs 45, in a circumferential guide 46 formed in the rotary plate 14.

In the interior of the cylinder 44 slides a piston 47 connected by means of a rod 48, resiliently mounted by means of a spring controlled shackle 49, to the arm 50 of a lever pivoted at 51 to a bracket 52 secured to the plate 14, the second arm 53 of which is provided with a button 54. The end of the rod 48, beyond its joint to the arm 50, is connected to a fixed point 55 of the bracket 52, by means of a spring 56 which therefore tends to push forward the piston 47 and with it the cylinder 44 in order to bring it against the front end of the guide 46. At points which come into contact with the button 54 when the cylinder 44 is above one of the receptacles 13, are secured to the fixed part of the machine, for instance to uprights 57, plates 58 in each of which is provided an ascending and descending groove 59 with which engages the button 54 (Fig. 10).

Owing to the piston 47 being mounted at the end of the arm 50 which is pivoted at 51, the weight of the piston inself and of its accessories tends to maintain the piston in engagement with the plate 12, so that when the cylinder 44, owing to the rotation of the plate 14, is brought exactly above one of receptacles 13 as shown in Fig. 9, the piston slightly penetrates into it, thus coupling together the receptacle 13 and the cylinder 44 which is then stopped. On the contrary, the plate 14 continues to rotate, and the button 54 engages with the groove 59 of the stationary plate 58 and first causes the piston to descend (when the button rises along the ascending portion of the cam groove) and afterward raises it.

During this movement of the piston 47 the cylinder 44 remains stationary, being still coupled by the piston to the receptacle 13, while the plate 14 advances, so that the cylinder 44 moves along its guide. As soon as the piston in rising has released the receptacle 13, the cylinder 44 is released and under the action of the spring 56, suddenly advances in the guide 46 in order to resume its original most advanced position.

The described working of the piston 47 produces first a discharge of the infusion formed by the hot water previously introduced into the receptacle 13, and then the discharge of the grounds which were left in the receptacle.

To make this double function of the piston 47 possible, each receptacle 13 must be closed at the bottom by a cover where the infusion could collect, and which can disappear at a given moment in order to enable the grounds to escape.

For that purpose, under each receptacle 13 is provided a horizontal chamber 60 (Figs. 1, 11, 13–15) into the bottom wall of which opens, opposite the receptacle 13, the mouth or opening 61 of a lower receptacle 62 intended to receive the grounds. In the chamber 60 is mounted in a radially adjustable manner a part comprising, in line with each other in the direction of said radial movement, a ring 63 and a cup 64 supported by the end of a hollow arm 65. The latter is pivoted to a vertical bracket 66, and its inner space is in communication at one end with the cup 64, and at the opposite end with a lower receptacle 67 intended to receive the infusion.

In the construction illustrated where there are four receptacles, 13, there are two reservoirs 67 and at each of them terminate the hollow arms 65 corresponding to two receptacles 13, but of course the arrangement could also be such that the infusion from each receptacle 13 would be discharged into a separate reservoir 67, or that a larger number of receptacles 13 would discharge into a single reservoir. In any case, the reservoirs 67 comprise a cock or tap 68 for drawing the made coffee (Fig. 4).

The opening of the cup 64 of each of the arms 65 (Figs. 14 and 15) is provided with a perforated partition 69 constituting a filter or strainer, and below one of such partitions is mounted a plate 70 which a spring 71 tends to keep in closed position against the strainer 69. Each of the arms 65 is provided, close to its pivot, with a projection 72 (Figs. 11–13) to which is connected a radial rod 73, adjustable in the direction of its axis in a bracket 74, the free end being provided with a button 75 engaging with a cam groove 76 of a disk 77 keyed to the main spindle 78 of the machine, to which is also connected the rotary plate 14.

The groove 76 of each disk 77 is circular, except that at 79 it is closer to the axis, this portion being in such direction that the button 75 reaches it when the hollow arm 65 has to swing about the axis of the bracket 66 in order to bring under the opening of the receptacle 13 the ring 63 in place of the cup 64.

In the construction illustrated where there are four receptacles 13, the depressed portions 79 of the grooves 76 are shifted to the extent of 90° in the disks 77 corresponding to the various arms 65, there being a disk 77 for each arm 65. Each receptacle 13 comprises thus a bottom which disappears at a given moment, and it is obvious that by regulating the position of the disks 77, each receptacle 13 will be closed by its bottom cover during the introduction of the ground coffee and water, as the spring 71 keeps the plate 70 in engagement with the strainer 69, while owing to the compression exercised by the piston 47, the plate 70 opens, and the infusion passes into the cup 64 and through the hollow arm 65 descends into the reservoir 67. Finally, when the piston 47 is about to reach the bottom end of its stroke, the cup 65 is moved away, and its place is taken by the ring 63, owing to which the grounds which are pushed out by the piston 47, can escape.

The working of the parts described is brought about by the rotation of the spindle 78 to which are keyed the disks 77 as well as the plate 14, and which is supported by a bracket 80.

The driving of the spindle 78 could be effected by hand, by means of a small spindle 81 to which is keyed a worm 82 engaging with a worm wheel 83 keyed to the spindle 78 (Fig. 4); it could also be effected by means of a motor rotating the pulley 84 keyed to a spindle 85 which carries a pinion 86 meshing with a gear wheel 87 which can be coupled to the spindle 81 by means of a claw clutch 88 operated from the outside.

To the pulley 84 could be secured another pulley 89 connected by a belt to the pulley 9 for operating the coffee mill (Fig. 3).

To facilitate the manipulation of the machine, automatic devices could be provided for operating the clutch 88 for the purpose of working the machine either in a continuous manner or only during a desired time period.

To that end in the construction illustrated by way of example, the clutch 88 is connected to a plate 90 which can move parallel to itself in the direction of the axis of the clutch (Figs. 1 and 16–21). This plate 90 is connected to a spring 91 tending to bring it into the position in which the clutch 88 is thrown out of gear, and the said plate can be operated, in the direction opposite to that of the spring 91, by means of a button 92, the rod of which meets the plate 90 and has a tooth 93 which can engage with a fixed stop 94, when the button 92 is rotated about the axis of its rod. By pushing the button 92 and by locking it by means of the tooth 93 on the stop 94, the clutch 88 is brought into gear and retains that position until the button 92 is withdrawn; the machine works then in a continuous manner.

Against the plate 90 bear collars 95 on the rods 96 of other buttons 97.

Parallel to the vertical axis of the machine, are mounted rotatably two spindles 98 and 102. On the spindle 98 is mounted a pinion 99 engaging with a pinion 100 of the same diameter on the spindle 78 (Fig. 12) and as many pinions 101 as there are buttons 97 are also mounted on spindle 98. On the spindle 102 are mounted loose pinions 103, each meshing with a pinion 101.

The ratio between the wheels 101—103 must be such that one complete revolution of the pinion 103 should correspond to an angular movement, or to a number of revolutions of the spindle 98 (and consequently of the drive of the machine), for which the receptacles 13 become operative once, twice or a greater number of times, that is to say, so that a determined quantity of infusion is prepared.

Each wheel 103 has on its upper face a groove 104 with which can engage with friction an annular projection 105 of a loose disk 106 engaging with the fork 107 of a lever 108. This lever has a transverse arm 109 which normally is in engagement with a cam tooth 110 of the rod 96 of the corresponding button so as to keep the disk 106 raised, and the said disk comprises a groove 111 with a single radial recess 112, with which can engage a button 113 mounted resiliently on the end of the rod 96.

In the position shown in Fig. 16, all the buttons occupy the outermost position, and the clutch is out of gear.

When it is desired that the machine should execute a given number of operations, it is sufficient to press the button 97 corresponding to the wheels 101 and 103 which have the desired ratio of transmission. The collar 95 then pushes the plate 90 inward and throws in the clutch 88, and at the same time, owing to the axial movement of the rod 96, the cam tooth 110 releases the arm 109 of the lever 108, and the button 113 passes, through the recess or opening 112 which is opposite it, into the groove 111 of the disk 106. The disk 106 descends and comes into engagement with the wheel 103 which then rotates with the wheel 101, while the rod 96 remains in engagement with the groove of the disk 106 and the button 97 is locked in its advanced position into which it has been brought by the operation.

These conditions remain until the recess or opening 112 of the groove 111 arrives again in front of the button 113, that is to say until the wheel 103 has made a complete revolution. At that moment the spring 91 acting on the plate 90 and on the rod 96, forces the button 113 to leave the groove 111 of the disk 106 and then the rod 96 is moved back, the coöperating parts 110 and 109 lifting the disk 106; at the same time the clutch 88 is disengaged, so that the whole machine automatically returns to the position of rest.

Whatever be the method of operating the machine, that is to say, by hand, by means of a crank keyed to the spindle 81, or by a motor, with or without automatic stopping, this operation results in rotating the hollow spindle 78 and with it, in the direction of the arrow in Fig. 2, the plate 14 mounted above the stationary plate 12 supporting the receptacles 13. The plate 14 normally keeps closed the upper openings of the receptacles 13 and brings, successively and in the desired order, above each receptacle 13, the parts described for the introduction of the ground coffee, for the supply of water and for the discharge of the infusion and of the coffee grounds.

In considering only one of the receptacles 13, above the same arrives first the part constituted by the disk 15 and the disk 18, which rotates about the vertical pivot pin 16, so that its openings 20 pass successively from the zone into which opens the chute 11 coming from the coffee mill, to the zone into which opens the receptacle 13. The quantity of ground coffee which passes from the chute 11 into one of the openings 20 of the disk 18 when it is under the said chute, is carried toward the receptacle 13, the bottom of which is closed by the cup 64 (see Fig. 1), and drops into the said receptacle when the opening 20 arrives above the receptacle.

This automatic distributer works in a continuous manner, for each of its openings is filled at one point of its travel and discharged at another point. Further, the working of this part can be adjusted at will and according to the requirements, by adopting a different number of openings 20 and by modifying accordingly the ratio of transmission.

Above the receptacle 13, where the introduction of the ground coffee takes place, is brought, after a small angular movement of the plate 14, the cylinder 26 communicating with the boiler, the said cylinder being stopped in that position by the blade 27' against which press the teeth 26' of the cylinder.

As the stoppage of the cylinder 26, which can slide in its guide 27, does not interfere with the rotation of the plate 14, the arm 41 strikes the fixed stop 42 and causes the piston 33 to descend. The latter first closes communication between the cylinder 26 and the pipe 29 and then, the valve 34' being closed, forces the hot water contained in the cylinder 26, through the perforated partition 32 whence it descends uniformly distributed on to the ground coffee which has previously dropped on to the bottom of the receptacle 13.

The stroke of the piston 33 is terminated when the end of the arm 41 can pass above the stop 42 which is vertically adjustable in order to enable the said stroke and the quantity of water introduced to be modified, and at practically the same moment the cylinder 26 will have reached the rear end of its guide 27. The movement of the plate 14 is then transmitted direct to the base of the cylinder 26, the tooth 26' of which is forced to move the flexible stop 27' and the spring 28 brings the cylinder back to the front end of its guide 27, while the spring 39 raises the piston 33 whereupon more water is admitted from the boiler into the cylinder 26.

The receptacle 13 which contains the ground coffee and the necessary quantity of hot water, is again closed at the top by the plate 14; this gives the infusion period during which the infusion is formed, this period continuing until the expelling part or ejector reaches the receptacle 13.

The infusion period must have a certain duration, and to that end the part for introducing water and that for discharging the infusion are mounted on the plate 14 at the greatest possible angular distance.

When the cylinder 44 arrives above the receptacle 13, the piston 47 passes into the receptacle 13 and stops the cylinder 44 while the plate 14 still continues to advance. During this relative movement, the button 54 engages with the groove 59 of the stationary plate 58, and the piston 57 descends into the receptacle 13 which is still closed at the bottom by the cup 64.

Owing to the pressure exercised by the piston 47 in the interior of the receptacle 13, the plate 70 mounted by means of springs in the interior of the cup 64 is lowered and the infusion passes through the strainer into the chamber of the arm 65 and thence into the reservoir 67.

When the piston 47 is about to reach the end of its stroke, the button 75 of the rod 73 reaches the depressed portion of the groove 76 provided in the disk 77 so that the arm 65 swings outward about the axis of the bracket 66, and brings the ring 63 under the receptacle 13. Consequently, during the last portion of its downstroke, the piston 47 expels from the receptacle 13 the grounds which it had previously compressed on the strainer 69 when expelling the infusion contained therein.

The button 54 engages with the descending portion of the groove 59 of the plate 58, so that the piston 47 rises again, and as soon as it leaves the receptacle 13 releasing the cylinder 44, the spring 56 which was cocked during the movement of the cylinder 44 relatively to the plate 14, brings the cylinder and the accessory parts back to their original position, that is to say to the front end of the guide 46.

In the receptacle under consideration therefore all the operations take place which are required for forming the infusion and for discharging the infusion and the grounds. The opposite oscillation of the arm 65 produced subsequently by the portion 79 of the groove 76 of the disk 77, forces the cup 64 to return under the receptacle 13 which is then again in the desired positions for repeating the operation.

The cycle described takes place in each of the receptacles 13, and is repeated as long as the rotation of the plate 14 continues, so that according to the number of receptacles 13, it is possible to build, with the same parts, machines having very different capacities.

Each arm 65 carrying the cup 64 intended to close the bottom of a receptacle 13, can terminate in a lip from which the infusion would flow as it is formed, or as in the construction illustrated, two or more arms 65 could terminate at a joint reservoir from which the infusion is drawn as required.

When the machine is to comprise only one receptacle 13, the same working could be obtained with a machine of a simplified construction.

This modified construction is shown in Figs. 22–27 in which the parts of the machines, identical with those already described, are omitted.

In this construction also, the receptacle in which the infusion is formed, is constituted by a vertical cylinder 13 secured to the plate 12. Above the said cylinder is mounted, concentrically therewith and secured to a bracket 115 mounted on the plate 12 by means of feet 116 (Fig. 24), another cylinder 114 of the same diameter in which can slide a piston 117 which is intended to introduce hot water as well as to discharge the infusion and the grounds.

The bottom opening of the cylinder 114 and the upper opening of the cylinder 13 are separated from each other by a gap in which are mounted two plates 118 and 119 which are superposed and can turn in a horizontal plane.

The first of these plates comprises two holes 120 and 120' of a diameter equal to that of the cylinders 13 and 114 and in such a position that one or the other of them can be brought to coincide with the openings of the cylinders. The other plate 119 comprises a hole 122 of a diameter equal to that of the hole 120, and a part 123 provided with small holes, the hole 122 and the perforated part 123 being in such a position that one or the other of them can be brought to coincide with the openings of the cylinders 13 and 114.

The plate 118 is pivoted by means of a rod 118' to the plate 12, and the plate 119 is pivoted by means of a rod 119' to a fixed arm 124 (Fig. 25). The hub of each of these oscillating parts is provided with an axial extension 125 or 126 connected by a spring 127 or 128 to a fixed point of the machine in such a manner that the said spring does not exercise any action on the oscillating part when it occupies its intermediate position but tends to bring it into its end position when it moves away from the said intermediate position.

The travel of the extension 125 of the rod 118' is limited by two stops 129 and 130 against which it strikes when the plate 118 occupies the positions with one or the other of the holes 120 and 120' above the receptacle 13. The rod 118' has an arm 131 and a tooth 132 with which can engage the projections 131' and 132' on a disk 133 rotating with the spindle 78 of the machine. In the same way, the rod 119' has an arm 134 and a tooth 135 which engage the projections 134' and 135' of the disk 133.

With the disk 133 rotates a pulley 136, keyed to the spindle 78 of the machine, which is provided on its cylindrical face with a groove 137, a portion of which has the section shown in Fig. 27. With the said groove engages one end of an arm 138 of a lever 139 pivoted at 140 and connected at the opposite end to the piston 117 by a link 139'.

Finally, at the cylinder 114 terminates a pipe 29 coming from the boiler and controlled by a cock or tap 141, the plug of which is connected to a star wheel 141' with which engage successively two fingers 142, 142' of the pulley 136 (Figs. 22 and 23) so as to open and close successively the said cock.

The chute 11 through which passes the ground coffee coming from the coffee mill, opens into the bracket 115 (Fig. 24) at the point where the hole 120' of the plate 118 is situated when the latter occupies the end position shown in Fig. 25.

In these conditions the ground coffee drops into the hole 120' the capacity of which can be regulated so as to vary the quantity received, and the charge is ready. During the rotation of the spindle 78, the pulley 136 and the disk 133 rotate in the direction of the arrows and produce the following cycle, the beginning of which is assumed to be when the arm 138 of the lever 139 is in the portion VI of the groove 137 (Fig. 27).

At that moment the bottom of the piston 117 is close to the lower opening of the cylinder 114, and it remains in that position during the movement of the disk 133 of the amplitude of said portion VI, while on the extension 135' of the disk 133 striking the tooth 135 of the rod 119'—, the latter with the plate 119 will be brought into the intermediate position whence the spring 128 will push it into the opposite end position, with the perforated partition 123 under the opening of the cylinder 114.

When the end of the arm 138 penetrates into the portion VII of the groove 137, the bottom of the cylinder 114 will be closed by the perforated partition of the plate 119, and the piston 117 will rise while the finger 142 of the pulley 136 will open the cock 141, so that the water from the boiler will fill the cylinder 114 until the next finger 142' engages with one of the spokes 141' of the plug of the cock 141 which will thus be closed.

The pulley 136 continuing to rotate, the arm 138 will pass into the portion VIII of the groove 137, and the piston 117 again descends until it reaches the perforated partition 123 through which it forces the water which passes into the lower cylinder 13, the bottom of which, closed by the cup 64, is occupied by the coffee previously introduced.

The position described is retained during the whole time that the arm 138 remains in the portion I of the groove 137, and corresponds to the infusion period during which the infusion is formed.

When the arm 138 passes into the portion II of the groove 137, the projection 134' of the disk 133 strikes the arm 134 of the rod 119' and swings the plate 119 in the direction opposite to the preceding one, so that the perforated partition 123 disappears, and above the opening of the cylinder 13 is placed the hole 122 of the plate 119.

In a similar manner, the projection 132' of the disk 133, on striking the tooth 132 of the rod 118', produces oscillation of the plate 118 as to bring under the chute 11 the hole 120 which was under the cylinder 114.

The openings of the cylinders 114 and 13 are thus free, and the piston 117, under the action of the lever 139, the arm 138 of which engages with the groove 137, descends and in passing into the cylinder 13 (portion III of the groove 137, Fig. 27) brings about the discharge of the infusion formed during the preceding period.

The subsequent descent of the piston 117 in the portion IV of the groove 137 results in compressing the grounds and in discharging the same, for at this moment the cup 64 is out of the way.

The cycle is then completed and in the successive portion V of said groove there is a rapid rising of the piston 117 until it reaches the level of the opening of the cylinder 114, while the projection 131' strikes the tooth 131 of the rod 118', and the plate 118 swings in such a direction as to bring over the cylinder 13 the hole 120 which previously, while under the chute 11, was filled in with ground coffee, and the projection 135' on striking the tooth 135 of the rod 119' brings the perforated partition 123 of the plate 119 under the opening of the cylinder 114. The ground coffee is therefore introduced into the receptacle 13, and the conditions which existed at the beginning of the cycle, are reestablished.

The diagram in Fig. 26 shows the action of the projections of the rotary disk 133 on the two rods 118' and 119' which bring about oscillation of the plates 118 and 119 by starting their movement which afterward, as soon as the intermediate position has been passed, is completed by the action of the springs 127 and 128 bringing the corresponding plate into its end position.

This oscillation of the plates 118 and 119 results, as has been shown, in bringing the hole 120 or 120' under the chute 11, and the perforated partition 123 or a free hole over the cylinder 13.

The plate 118 could also have a single hole like 120. The pins 129 and 130, against which the extension 125 of the rod 118' strikes, produce in the plate 118 vibrations which assist in the descent in the cylinder 13 of the ground coffee with which the hole 120 or 120' is filled, and complete the charge during the time that the hole is under the chute 11.

The cycle described for forming an infusion corresponding to the capacity of the cylinder 13 is completed during one revolution of the spindle 78, that is to say of the pulley 136 and of the disk 133, so that the automatic drive previously described must be so adjusted that the machine makes one or more revolutions according as it is desired to have one or more operations.

The machine described, although it is more particularly adapted to prepare infusion of coffee, could also be used for preparing other similar infusions. It could also be used for preparing infusions of a different nature by constructing the distributer so that it should bring into the various receptacles the materials used for preparing the various infusions.

What I claim as my invention and desire to secure by United States Letters Patent is:—

1. An automatic machine for making infusions, comprising a stationary receptacle for receiving the liquid and the material of which the infusion is to be made, said receptacle having its axis disposed vertically; means for feeding the ground material and the liquid, said feeding means being adapted to coöperate in succession with said receptacle; means for exerting a pressure in said receptacle to discharge the infusion therefrom; removable means at the bottom of said receptacle for alternately closing and opening the same; and means for operating the movable parts of the machine.

2. An automatic machine for making infusions comprising a stationary receptacle, said receptacle being disposed with its axis vertical; means for feeding the ground material and the liquid, said feeding means being adapted to move in succession into position above said receptacle and to coöperate therewith; means for exerting a pressure in said receptacle to discharge the infusion; a removable bottom at the lower mouth of said receptacle; and means for operating the movable parts of the machine.

3. An automatic machine for making infusions, comprising a stationary cylinder for forming the infusion, said cylinder being disposed with its axis vertical; means for feeding the ground material and the liquid, said feeding means being adapted to move in succession into position above said cylinder and to coöperate therewith; a piston adapted to enter said cylinder for discharging the infusion; a removable bottom at the lower mouth of the cylinder; and means for operating the movable parts of the machine.

4. An automatic machine for making infusions, comprising a stationary receptacle for forming the infusion, said receptacle being disposed with its axis vertical; means for feeding the ground material and the liquid, said feeding means being adapted to move in succession into position above said receptacle and to coöperate therewith; means for exerting a pressure in said receptacle to discharge the infusion; a removable bottom at the lower mouth of the receptacle, said bottom providing means for collecting the infusion; and means for operating the movable parts of the machine.

5. An automatic machine for making infusions comprising a stationary part having receptacles for forming the infusion therein, a receiver for containing ground material, a rotatable delivery member, ports in the delivery member adapted to come in register in succession with said receiver and with each of said receptacles to deliver therein said ground material, means for adjusting the size of said ports, means for supplying liquid to each of said receptacles, and means for discharging in succession the infusion and the grounds from said receptacles.

6. An automatic machine for making infusions comprising a stationary part having receptacles for forming the infusion therein, a receiver for containing the material of which the infusion is to be made, a mill for grinding said material, means for delivering a measured amount of said material to each of said receptacles, means for supplying liquid to each of said receptacles, and means for discharging in succession the infusion and the grounds from said receptacles.

7. An automatic machine for making infusions comprising a stationary part having receptacles for forming the infusion therein, means for delivering a measured amount of ground material to each of said receptacles, means for supplying a predetermined amount of liquid to each of said receptacles, and means for discharging in succession the infusion and the grounds from said receptacles.

8. An automatic machine for making infusions comprising a stationary part having receptacles for forming the infusion therein, means for delivering a measured amount of ground material to each of said receptacles, a cylinder adapted to be put in communication with the mouth of each receptacle, a reservoir and pipes supplying liquid to said cylinder, a piston sliding in said cylinder, means for shifting said piston to drive the liquid inclosed in said cylinder into the receptacle connected therewith, and means for discharging in succession the infusion and the grounds from said receptacles.

9. An automatic machine for making infusions comprising a stationary part having receptacles for forming the infusion therein, means for delivering a measured amount of ground material to each of said receptacles, a cylinder adapted to be put in communication with the mouth of each receptacle, a reservoir and pipes supplying liquid to said cylinder, a piston sliding in said cylinder, a perforated partition at the mouth of said cylinder, means for shifting said piston to drive the liquid inclosed in said cylinder into the receptacle connected therewith through said perforated partition, and means for discharging in succession the infusion and the grounds from said receptacles.

10. An automatic machine for making infusions comprising a stationary part having receptacles for forming the infusion therein, a part moving in contact with said stationary part, means on said moving part for delivering a measured amount of ground material to each of said receptacles, a cylinder mounted in movable relation on said moving part and adapted to come in register with the mouth of each receptacle, means for engaging temporarily said cylinder with said stationary part when it is in register with one of said receptacles, a reservoir and pipes supplying liquid to said cylinder, a piston in said cylinder, coöperating means on said stationary and moving parts for shifting said piston to drive the liquid inclosed in said cylinder into the receptacle to which the same cylinder is connected, means for releasing said cylinder from said stationary part and carrying it to its original position with regard to said moving part, and means for discharging in succession the infusion and the grounds from said receptacles.

11. An automatic machine for making infusions comprising a stationary part having receptacles for forming the infusion therein, means for delivering a measured amount of ground material to each of said receptacles, a cylinder adapted to be put in communication with the mouth of each receptacle, a reservoir and pipe supplying liquid to said cylinder, a piston in said cylinder, said supply pipe opening in said cylinder just under the end of the piston in its position most remote from the mouth of said cylinder, means for shifting said piston to drive the liquid from the cylinder into the receptacle connected therewith, and means for discharging in succession the infusion and the grounds from said receptacles.

12. An automatic machine for making infusions comprising means for receiving the liquid and the material from which the infusion is to be made, means for delivering a measured amount of ground material to said receiving means, means for supplying liquid to said receiving means, a member in register with said receiving means, a plunger mounted to move in said member, means for driving said plunger into said receiving means and removing it therefrom, a part forming the bottom of said receiving means and providing means for collecting the infusion and means for receiving the grounds, means controlling said bottom part in timed relation with said plunger, and operating means to carry in succession in register with said receiving means first the said infusion collecting means and then said ground receiving means at the time said plunger is being driven into said receiving means.

13. An automatic machine for making infusions comprising a stationary part having receptacles for forming the infusion therein, a part moving in contact with said stationary part, means on said moving part for delivering a measured amount of ground material to each of said receptacles, means for supplying liquid to each of said receptacles, a member mounted in movable relation on said moving part and adapted to come in register with the mouth of each receptacle, a plunger mounted to move in said member, coöperating means on said stationary and moving parts to drive said plunger into said receptacle and remove it therefrom; the plunger temporarily coupling said movable member with said stationary part, means for carrying said movable member to its original position with regard to said moving part after said plunger is removed from said receptacle, a part forming the bottom of each receptacle, and also forming means for collecting the infusion and means for receiving the grounds, means controlling said bottom part in timed relation with said plunger and operating means to carry in succession in register with said receptacle said infusion collecting means and grounds receiving means when said plunger is driven into said receptacle.

14. An automatic machine for making infusions comprising a stationary part having receptacles for forming the infusion therein, a moving part adjacent to said stationary part, means in said moving part for introducing in succession ground material and liquid into said receptacle, and means for discharging in succession the infusion and the grounds from said receptacles.

15. An automatic machine for making infusions comprising a stationary part having receptacles for forming the infusion therein, a moving part adjacent to said stationary part, means in said moving part for introducing in succession ground material and liquid into said receptacles, means for discharging in succession the infusion and the grounds from said receptacles, a gear driving said moving part, a clutch in said gear, and means for controlling this clutch.

16. An automatic machine for making infusions comprising a stationary part having receptacles for forming the infusion therein, a moving part adjacent to said stationary part, means on said moving part for introducing in succession ground material and liquid into said receptacles, means for discharging in succession the infusion and the grounds from said receptacle, a gear driving said moving part, a clutch associated with said gear, means for controlling the clutch, means for engaging said clutch in operative position, and means for releasing said clutch after a predetermined number of revolutions of said moving part.

17. An automatic machine for making infusions comprising a stationary part having receptacles for forming the infusion therein, a moving part adjacent to said stationary part, means on said moving part for introducing in succession ground material and liquid into said receptacles, means for discharging in succession the infusion and the grounds from said receptacles, a gear driving said moving part, a clutch associated with said gear, means for controlling the clutch, means for engaging said clutch in operative position, a shaft driven by said moving part, driving pinions rigid with said shaft, a spindle parallel with said shaft, driven pinions loose on said spindle, each driven pinion meshing with one of said driving pinions under a different ratio, means on each of said driven pinions for engaging any one of them with said spindle, parts each controlling one of said engaging means, each of said controlling parts operating to couple said clutch when carried in position to couple its associated pinion with said spindle, means acting to hold said controlling parts in inoperative position, and coöperating means on said driven pinions and associated controlling parts to hold said controlling parts in clutching position and to release said controlling parts after an entire revolution of the associated driven pinions.

18. An automatic machine for making infusions comprising a stationary part having a receptacle, means for feeding ground material to said receptacle, a cylinder in register with said receptacle, the mouths of said receptacle and cylinder being spaced to form an intermediate gap, means for supplying a liquid to said cylinder, slides moving in said gap and having means for connecting said receptacle in succession with said material feeding means and cylinder, means for forcing the liquid from said cylinder into said receptacle, and means for exhausting the infusion and the grounds from said receptacle.

19. An automatic machine for making infusions comprising a stationary part having a receptacle, means for feeding ground material thereto, a cylinder opening in register with said receptacle, the opposite mouths of said cylinder and receptacle providing an intermediate gap, a plate mounted to move in said gap, said plate having a port adapted to register in succession with said material feeding means and with said receptacle when said plate is oscillated and also having an opening registering with said receiver when said port registers with said feeding means, a second plate pivoted on said stationary part to move in said gap and in contact with the first named plate, the second named plate having a hole and a perforated portion each adapted to come in succession in register with the mouth of said receptacle, a plunger adapted to move in said cylinder and to enter said receptacle, an arm for operating said plunger, means for supplying a liquid to said receptacle; a rotary member controlling said liquid supplying means, plunger arm and plates to carry in succession said port in register with said material feeding means and with said receptacle and then said opening in register with said receiver, then the perforated portion of the second named plate in register with said receptacle, to close the liquid supply and to drive said plunger for forcing the liquid of the cylinder into said receptacle, to shift the hole of the second named plate in register with said receptacle and to drive said plunger into said receptacle; spring means for carrying said plates at each end of their stroke after they are shifted by said rotary controlling member, a part forming the bottom of said receptacle and providing means for collecting the infusion and for receiving the grounds, and means operated in timed relation with said plunger to carry in succession said collecting means and receiving means in register with the bottom of said receptacle when said plunger is driven therein.

In testimony whereof I affix my signature.
PIER TERESIO ARDUINO.